United States Patent
Bachl et al.

(10) Patent No.: US 8,520,755 B2
(45) Date of Patent: Aug. 27, 2013

(54) CHANNEL QUALITY DETERMINATION OF A WIRELESS COMMUNICATION CHANNEL BASED ON RECEIVED DATA

(75) Inventors: Rainer Bachl, Nürnberg (DE); Shashi Kant, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/141,489

(22) PCT Filed: Oct. 28, 2009

(86) PCT No.: PCT/EP2009/064206
§ 371 (c)(1),
(2), (4) Date: Jul. 15, 2011

(87) PCT Pub. No.: WO2010/072451
PCT Pub. Date: Jul. 1, 2010

(65) Prior Publication Data
US 2011/0261868 A1 Oct. 27, 2011

Related U.S. Application Data

(60) Provisional application No. 61/140,192, filed on Dec. 23, 2008.

(51) Int. Cl.
*H04K 1/10* (2006.01)

(52) U.S. Cl.
USPC .......... 375/260; 375/267; 375/299; 375/347; 375/349; 375/348

(58) Field of Classification Search
USPC .................. 375/260, 267, 299, 349, 347, 348
See application file for complete search history.

(56) References Cited

U.S. PATENT DOCUMENTS

| 5,852,630 A | * | 12/1998 | Langberg et al. | 375/219 |
| 2009/0028267 A1 | * | 1/2009 | Locke | 375/293 |
| 2010/0064185 A1 | * | 3/2010 | Zheng et al. | 714/704 |
| 2010/0220608 A1 | * | 9/2010 | Skillermark et al. | 370/252 |

FOREIGN PATENT DOCUMENTS

| WO | 2006/046894 A1 | 5/2006 |
| WO | 2007/111563 A2 | 10/2007 |
| WO | 2008/060247 A2 | 5/2008 |

* cited by examiner

*Primary Examiner* — Kabir A Timory
(74) *Attorney, Agent, or Firm* — Coats & Bennett, P.L.L.C.

(57) ABSTRACT

The invention refers to a method of determining a channel quality of a communication channel between a wireless transmitter and a wireless receiver, comprising receiving a transport block with one or a plurality of a modulation symbols ($y_1, \ldots, y_m$) comprising a plurality of encoded information bits ($x_1, \ldots, x_n$), de-mapping the modulation symbols to a plurality of soft values ($LLR_1, \ldots, LLR_n$), calculating a mutual information—MI—measure (MI) as a function of the plurality of soft values ($LLR_1, \ldots, LLR_n$), wherein the MI measure is indicative of a mutual dependence between the information bits ($x_1, \ldots, x_n$) and the corresponding soft values of said transport block, and determining a channel quality indication value (CQI-Index) as a function of the MI measure (MI). The invention further refers to a program and to a wireless receiver for performing the method.

18 Claims, 4 Drawing Sheets

CHANNEL QUALITY DETERMINATION OF A WIRELESS COMMUNICATION CHANNEL BASED ON RECEIVED DATA

TECHNICAL FIELD

The present invention relates to channel characteristics determination, and specifically to channel quality estimation of wireless communication channels within a mobile communications networks.

BACKGROUND

In wireless communication systems, a variation of the signal strength of a communication channel may occur e.g. due to environmental variations caused by a movement of a wireless terminal (due to multipath propagation variations, or to shadowing from obstacles); such channel is also being referred to as a fading channel. The channel quality of a fading channel might vary over time, frequency and space. If the channel quality is accurately estimated at a receiver's side, e.g. one of the terminals, it can be exploited by a transmitter, e.g. a base station of the mobile communications network to optimize the data transmission. In particular, in frequency division duplexing (FDD) systems including systems based on orthogonal frequency-division multiplexing OFDM, the terminals might estimate the channel quality to be fed back to the transmitter within a reasonably short feedback time. If the transmitter has the knowledge of downlink channel quality, the average throughput (and thus spectral efficiency) at the receiver side can be maximized while maintaining certain Quality of Service (QoS) parameters, e.g. a guaranteed bit-error rate.

A general problem for channel quality estimation is to estimate a block error rate (BLER) for a data packet transmitted over a communication channel using a plurality of sub channels, especially in OFDM systems, wherein a communication channel is divided into a multiple (narrow-band) sub-carriers, which allows orthogonal modulated streams of data to be transmitted in parallel on the sub carriers, assuming that the current propagation channel conditions in a frequency selective fading channel having different signal-to-interference-noise-ratios (SINR) per sub-carrier.

There are well known CQI estimation methods discussed in literature, e.g. a method called Exponential Effective SNR Mapping (EESM) being described in a document titled "System-level evaluation of OFDM—further considerations", published by 3GPP under the document number TSG-RAN WG1, R1-031303, Nov. 17-21, 2003 and a method called Mutual Information Effective SNR Mapping (MIESM), e.g. being described in the document titled "Effective-SNR mapping for modeling frame error rates in multiple-state channels", published by 3GPP under the document number C30-20030429-010, WG RAN1, 2003. Both methods use reference signals, i.e. utilize the estimated channel and noise variance for the computation of a channel quality indicator CQI.

If linear receivers (e.g., zero-forcing or minimum mean square error) are employed, the estimated effective channel and noise variance e.g. based on (cell-specific) reference signals might be used for CQI determination by post-processing SINRs and calculating an effective SNR value based on the post-processed SINRs.

However, CQI estimation based on common (cell-specific) reference signals might not be accurate enough if it does not precisely account for channel estimation errors. Furthermore, if maximum likelihood detectors are used rather than the linear equalizers, then the CQI can't be estimated employing EESM or MIESM methods, as such detectors are not able to deliver SINRs.

SUMMARY

It is an object of the present invention to improve a determination of channel quality.

This object is achieved by the independent claims. Advantageous embodiments are described in the dependent claims.

In an embodiment, a channel quality of a communication channel is determined at the receiver's side by de-mapping a sequence of received modulation symbols having encoded a plurality of information bits to a plurality of corresponding soft values, calculating an (overall) mutual information—MI—measure as a function of the plurality of soft values, wherein the MI measure is indicative of a mutual dependence between the plurality of information bits and the plurality corresponding soft values, also being referred to as soft bits that represent a reliability information with respect to a corresponding "hard decision" of whether an information bit was "1" or "0". Further a channel quality indication—CQI—value is determined on the base of the MI measure.

Mutual information is a term generally used in information or probability theory for a measure of the mutual dependence of two (random) variables. The (overall) mutual information as described above shall be indicative of the mutual dependence with respect to the plurality of soft bits. Consequently, the (overall) mutual information might be a function of a plurality of particular mutual information values for each one of the plurality of information bits. In an embodiment, the (overall) MI value is an average of the plurality of the particular MI values. Alternatively, other functions, e.g. a square root of the sum of squared particular MI values might be chosen to form the (overall) MI value.

The CQI estimation scheme is applicable to communication systems in general where channel quality needs to be evaluated. The above-described embodiment allows for deriving a channel quality CQI value based on actual data being received. In case of beamforming with dedicated reference signals (receiver specific beamforming), CQI of the receiver specific propagation channel would be estimated considering the actual data transmission.

In contrast to CQI estimation based on user-specific reference signals, the proposed scheme is applicable continuously and thus might yield to more accurate results, especially if non-linear receivers are employed in the system (it is to be noted that CQI estimation based on user-specific reference signals can only be evaluated during the actual data transmission and thus can only be based on a few dedicated reference symbols).

The MI measure might be determined over all information bits of one resource or transport block. In this case the MI measure is a value indicative of a mutual dependency of the whole transport block.

In OFDM based multiple access systems with frequency selective channels, CQI is often used per sub-band (or per bandwidth part) for frequency selective scheduling of users. Thus, in an embodiment, sub-band specific CQI can be computed by sorting the soft values value according to their sub-band and processing the sub-band specific soft values individually, if full bandwidth is allocated to the user.

In an embodiment, the soft values are, logarithmic likelihood ratios (i.e. the logarithm dualis of the likelihood ratio), also being referred to as log-likelihood ratios—LLR—, preferably being calculated by de-mapping the received modulation symbols.

In a further embodiment determining the channel quality indication value is performed by comparing the MI measure with a plurality of certain thresholds and determining a maximum threshold out of the certain thresholds that is below (or equal to) the MI measure, to be chosen as channel quality indication value and to be reported to the wireless transmitter. The thresholds might be chosen to result in a defined transport block error probability, e.g. a BLER below 10%.

In a further embodiment, each a different set of thresholds are chosen for different modulation schemes applied for data transmission; e.g. a first set of thresholds for QPSK, a second set of thresholds for 16QAM, and a third set of thresholds for 64QAM.

In a further embodiment, the MI measure is determined by calculating an average over a plurality of particular MI measures that are each being calculated as a function of an absolute value of one of the soft values, wherein the soft values are preferably so called log likelihood ratios each associated to a corresponding one of the information bits being encoded in the data stream.

In a further embodiment, the thresholds are dependent on at least one of: the actual modulation and coding scheme, the actual transport block size, a particular power setting for the actual transmission, and an assumed power setting for determining the CQI.

In a further embodiment, the communication channel comprises a plurality of sub channels with potential different sub channel propagation characteristics e.g. exhibiting different signal-to-interference-noise-ratios (SINR). The sub-channels might be realized as sub-carriers, wherein according to OFDM, a plurality of orthogonal modulated streams of data is transmitted in parallel on the sub carriers.

In a further embodiment, in a multiple input and multiple output—MIMO—transmissions environment with a plurality of different code words, for each code word an individual MI measure, and corresponding CQI values are determined to be fed back to the transmitter (1).

In an embodiment, the proposed metric reuses log-likelihood ratios that are required for data decoding.

Additional CQI can be introduced to indicate whether transmission with dedicated reference signals is preferred over transmission with common reference signals.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
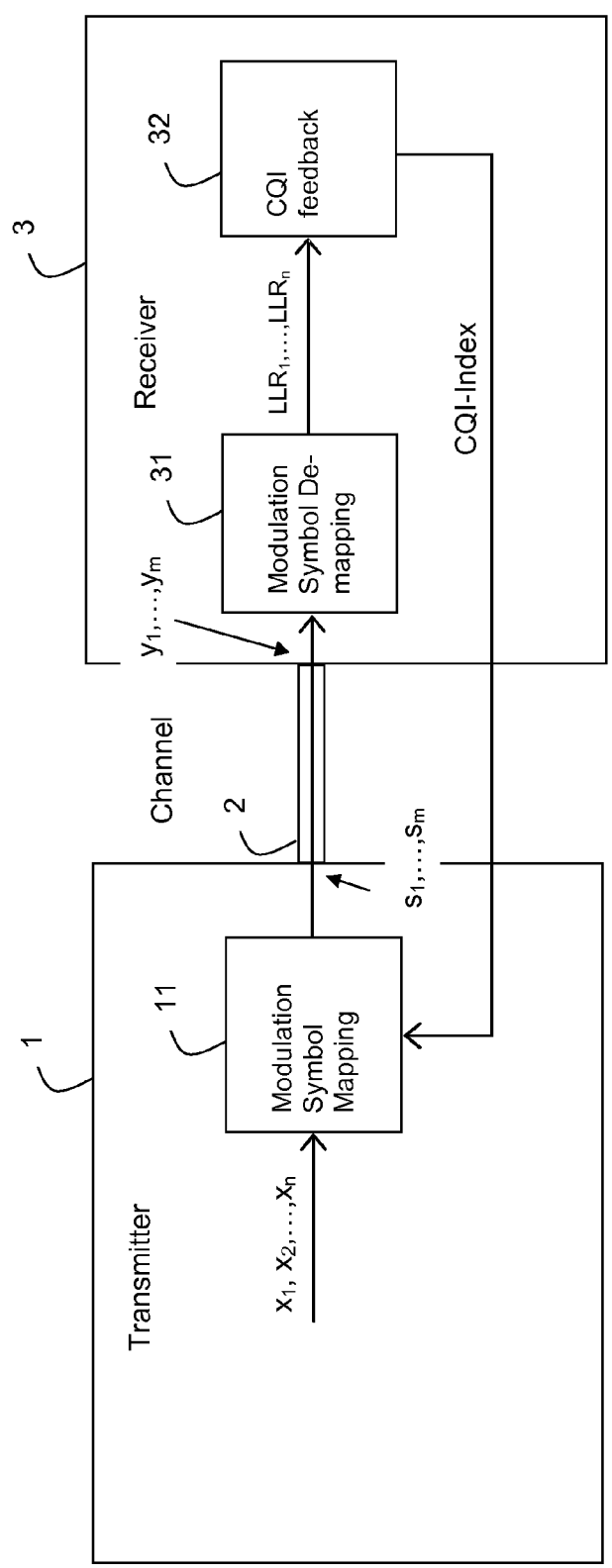
FIG. 1 shows a principle diagram of a feedback mechanism between a receiver and transmitter of a communication system.

FIG. 1 shows a principle block diagram for illustrating the concept of channel quality feedback within a mobile communications network according to embodiments of the invention. Thereto, FIG. 1 shows a transmitter 1, a communication channel 2 and a receiver 3. By way of example, a modulation mapping circuit 11 is shown being comprised by the transmitter 1, and a modulation de-mapping circuit 31 and a quality feedback circuit 32 and a data decoder 33 are shown being comprised by the receiver 3. By way of example, the modulation mapping circuit 11 receives a sequence of information bits $x_1, \ldots, x_n$ and encodes them to a sequence of modulation symbols $s_1, \ldots, s_m$ to be transmitted over the communication channel 2 towards the receiver 3. The modulation de-mapping circuit 31 receives a sequence of received values $y_1, \ldots, y_m$ that correspond to the modulation symbols $s_1, \ldots, s_m$, (but that are generally different due to channel characteristics and noise being added to the transmitted signals). It is to be noted that depending on the modulation scheme, a certain number of information bits are mapped into one modulation symbol, e.g. 2 information bits are mapped into one QPSK symbol, 4 bits are mapped into one 16QAM symbol, and 6 bits are mapped into one 64QAM symbol. A general task of the receiver 3 is to decode the encoded information bits $x_1, \ldots, x_n$.

Modern radio access systems, e.g. OFDM systems as described above, employ certain forward error correction schemes, such as convolutional codes and convolutional turbo codes. The receiver performance can be improved by using reliability information, rather than performing hard-decisions. A hard decision and its reliability value are usually represented by a single so-called soft value also being referred to as soft bits. For instance, soft bits are used as inputs for turbo decoding based on maximum a posteriori (MAP) and Maximum Likelihood (ML) decoding rule, respectively. Given modulations methods like e.g. Quadrature Phase Shift Keying (QPSK) or a Quadrature Amplitude Modulation (QAM), log-likelihood ratios (LLR) are used as soft bits to be provided to the decoder. According to such an environment, the modulation de-mapping circuit 31 de-maps the received values $y_1, \ldots, y_m$ into a sequence of de-mapped soft values $LLR_1, \ldots, LLR_n$. The data decoder 33 receives the de-mapped soft values $LLR_1, \ldots, LLR_n$ to retrieve the sequence of information bits $x_1, \ldots, x_n$ (i.e. to generate or estimate a sequence of most likely information bits).

As discussed in the introduction, the channel quality of the transmission channel might vary over time, frequency and space. If the channel quality is accurately estimated at a receiver's side, it can be exploited by a transmitter to optimize the data transmission. Accordingly, within actual mobile communication systems (e.g. based on LTE), information about the actual channel quality is typically obtained by the mobile terminals that generate so-called Channel-Quality Indicators (CQI) to be fed back at regular intervals to the base station. It is to be noted that the CQI does not necessarily explicitly indicate the channel quality, but rather a data rate supported by the receiver under the current channel conditions. Accordingly, the terms CQI or CQI index within the scope of this application should be interpreted broadly as any value based on measured channel conditions to be fed back from the receiver to the sender in order to set or adjust the data transmission (e.g. a data rate, a modulation scheme, a transport block size, etc.). Specifically, the CQI might be an information that a certain channel condition is met. Such information might be coded into a certain number of bits (e.g. 5 bits) representing one CQI index out of a certain number of pre-determined indices.

By means of the following FIG. 2 CQI determination within the receiver will be described in more details. Generally, in an APP (a-posteriori probability) processor, the soft inputs and the soft outputs are a-posteriori probabilities of the encoded information. APP decoding may be in the log-domain by means of a so-called LogAPP algorithm (also known as LogMAP), which works directly with log-likelihood ratios (LLRs). The outputs of the LogAPP algorithm are a posteriori LLRs of the info bits. Further information about LogAPP decoding can be drawn from the document titled "Computation of Symbol-Wise Mutual Information in Transmission Systems with LogAPP Decoders and Application to EXIT Charts", of Ingmar Land, Peter A. Hoeher, and Snjezana Gligorevic, Proc. 5th Int. ITG Conf. on Source and Channel Coding (SCC), Erlangen-Nuremberg, Germany, January 2004, pp. 195-202.

Figure 2:
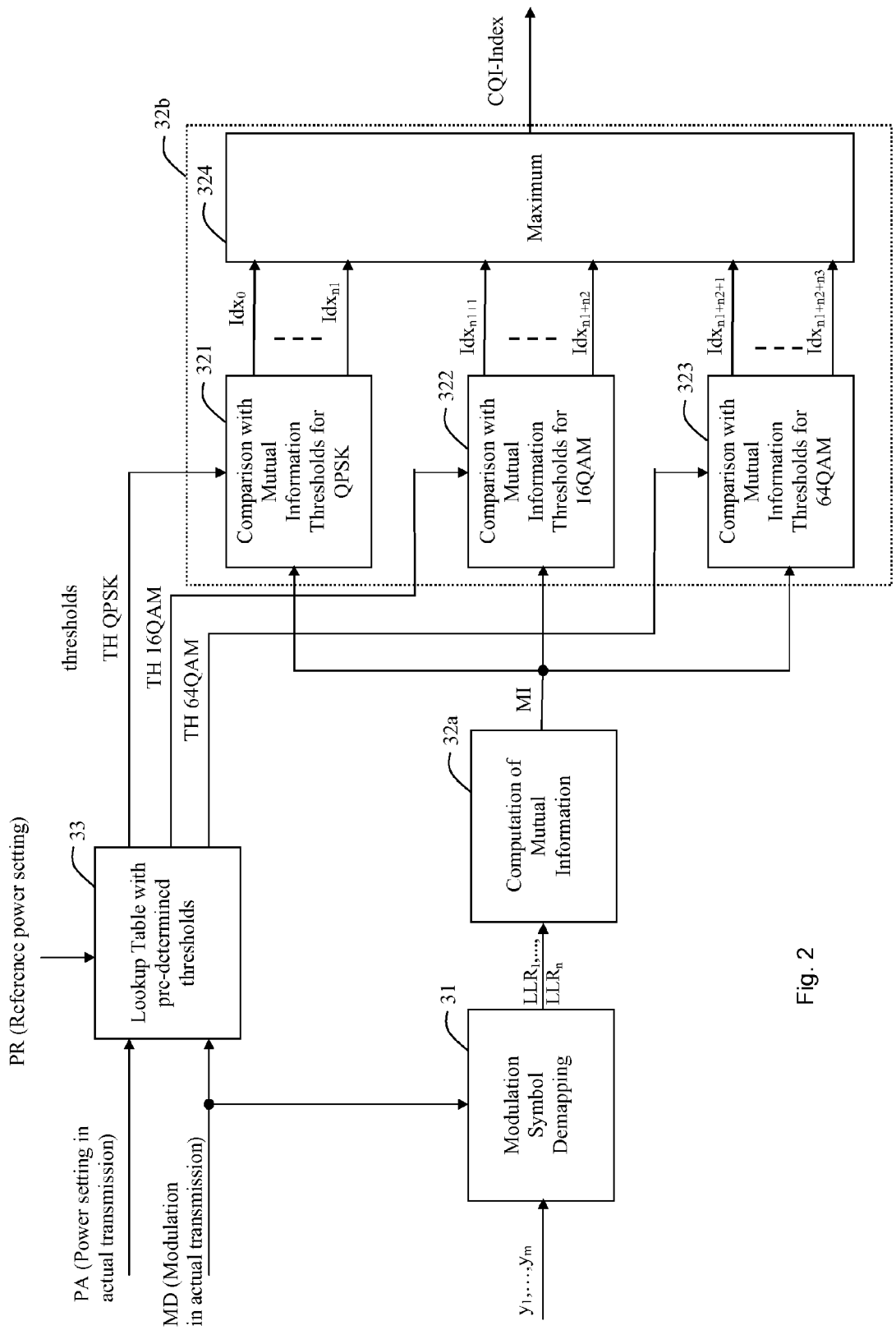
FIG. 2 shows an exemplary block diagram of a receiver comprising a processing circuit for determining a CQI-index associated to properties of the transmission channel to be fed back to the transmitter.

FIG. 2 shows the modulation de-mapping circuit 31 of FIG. 1, the CQI feedback circuit being distributed exemplarily into a Mutual Information—MI—determination circuit 32a and a CQI-Index determination circuit 32b, and a threshold setting circuit 33.

The symbol de-mapping circuit 31 receives the transmitted symbols $y_1, \ldots, y_m$. Further, this circuit receives a modulation information MD indicating an actual modulation used for the actual transmission, e.g. QPSK, 16QAM, 64QAM, etc. To obtain the log-likelihood ratios LLR(k), the modulation symbols $y_1, \ldots, y_m$ are de-mapped to so-called soft bits. By way of example, the de-mapping circuit 31 is so called LogMAP/LogAPP demapper rendering log-likelihood ratios LLR(k) as soft bits at the output.

The log-likelihood ratios may be further used as input to a data decoder as shown in FIG. 1, e.g. a possible rate-dematching and HARQ combiner followed by a Turbo decoder (e.g. working with LogMAP metrics).

The MI determination circuit 32a determines an overall statistical information or overall mutual information MI from a set of k=N specific mutual information values MI(1), ..., MI(n) being derived from the corresponding log-likelihood ratios.

From the absolute value of the k-th log-likelihood ratio that represents a reliability information of the k-th log-likelihood ratio, i.e. |LLR(k)|, the k-th mutual information MI(k) can be extracted:

$$MI(k) = \frac{1}{1+\exp(|LLR(k)|)} ld\left\{\frac{2}{1+\exp(|LLR(k)|)}\right\} + \frac{1}{1+\exp(-|LLR(k)|)} ld\left\{\frac{2}{1+\exp(-|LLR(k)|)}\right\}$$

wherein ld shall mean logarithm dualis.

It is to be noted that while the k-th particular mutual information MI(k) is obtained from the actual data transmitted, it does not depend on the actual value of the information bits.

In order to derive the overall measure statistical information, the overall MI value is obtained from the MI(k) e.g. by averaging the MI(k)'s over the so-called CQI reference resource, which is the resource in time and frequency where CQI is to be estimated:

$$MI = \frac{1}{N}\sum_{k=1}^{N} MI(k)$$

The MI thus obtained includes characteristics of the physical propagation channel as well as potential impairments from imperfect receiver front end and channel estimation.

The CQI-Index determination circuit 32b, receives the Mutual information MI together with a certain number of sets of thresholds TH QPSK, TH 16QAM and TH 64QAM provided by the threshold setting circuit 33.

By way of example, the CQI-Index determination circuit 32b comprises a first comparison circuit 321 for comparing the MI with a first set of thresholds TH QPSK, a second comparison circuit 322 for comparing the MI with a second set of thresholds TH 16QAM, and a third comparison circuit 323 for comparing the MI with the third set of thresholds TH 64QAM. Depending on the considered modulation, a corresponding one of the circuits is activated to determine the CQI-Index.

The CQI index to be reported is by way of example computed by a simple thresholding and maximum operation:

$$CQI\_Index(MI, Threshold(Idx)) = \operatorname*{argmax}_{Idx}\{Idx \mid MI > Threshold(Idx)\}$$

In other words, the CQI index to be reported is the maximum threshold out of all threshold of the corresponding set that is smaller than the MI. If e.g. QPSK is used, the first comparison circuit 321 is activated to determine the maximum threshold $Idx_t$ out of the thresholds $Idx_1, \ldots, Idx_{x1}$ of the first set of thresholds TH QPSK.

It is to be noted that every threshold corresponds to a particular channel condition and represents a particular CQI index that can be reported. The thresholds might correspond to a minimum MI, where transmission is successful with a certain BLER, e.g. 10%, under a given set of condition for the transmission.

It is further to be noted that The CQI might not explicitly indicate the channel quality, but rather the data rate supported by the receiver given the current channel conditions. More specifically, the CQI might be a recommended transport-block size (equivalent to a recommended data rate). According to current LTE specifications, the CQI is a 5 bit value to be fed back from the user equipment (receiver) to the NodeB (sender) at regular intervals.

Averaging the MI(k) values yields an appropriate metrics for CQI estimation, while averaging of the corresponding received SINR over the CQI reference resource would not yield useful metrics for CQI estimation due to high dynamics of the received SINR across sub-carriers.

The threshold setting circuit 33 might determine the thresholds offline e.g. by computation through simulations. This circuit might be further adjusted online e.g. using long-term statistics e.g. BLER.

The thresholds might depend on the following parameters:
the modulation scheme MD employed in the actual transmission. As discussed above a set of different thresholds might be used for each modulation scheme used in the actual transmission,
a modulation and coding scheme defined for the particular CQI index. It is to be noted that the transport block size might also change with the chosen modulation and coding scheme,
an actual power setting PA and a reference power setting PR for CQI estimation, or e.g. an offset between the power in the actual data transmission and the reference power. The reference power for CQI estimation is defined in some standards, while the power in the actual transmission (or the power offset between reference signals and data signals) is usually known in the receiver. Communications standards, e.g. 3GPP documents, often prescribe a set of pre-determined transmission powers and, hence, there is only a discrete set of power offsets that need to be considered.

In the following, exemplary extensions to sub-band CQI computation and CQI computation per codeword are described:

In OFDM based multiple access systems with frequency selective channels, CQI is often used per sub-band (per bandwidth part) for frequency selective scheduling of users. Sub-band specific CQI can be computed by sorting the LLR value according to their sub-band and processing the sub-band specific LLR values individually as shown in the previous section, if full bandwidth is allocated to the user.

In the case of MIMO (multiple inputs and multiple outputs) transmissions with more than one codeword, the CQI estimation may be performed individually for each codeword. In particular, the MI values for every codeword are processed separately as described above to yield two individual CQI that are fed back to the transmitter.

For taking a decision between transmission with dedicated reference signals (also being referred to as beam forming) or common reference signals, a differential CQI value is proposed that indicates the gains or losses in data throughput from using dedicated reference signals versus data throughput from using common reference signals. If the communication system allows for switching between transmission with common reference signals and transmission with dedicated reference signals, e.g. as in LTE, this decision can be used to adaptively switch between both transmissions.

The CQI for transmission with common reference signals can be obtained with well known techniques e.g. employing EESM or MIESM methods as described in the background section. In particular, common reference signals are transmitted continuously and therefore CQI for common reference signals can always be evaluated in parallel with CQI for transmissions with dedicated reference signals. Note that data throughput (and therefore also CQI) for transmission with dedicated reference signals might be either higher (due to the improved channel conditions due to user specific beam forming) or lower (due to the increased overhead from using dedicated reference signals).

Figure 3:
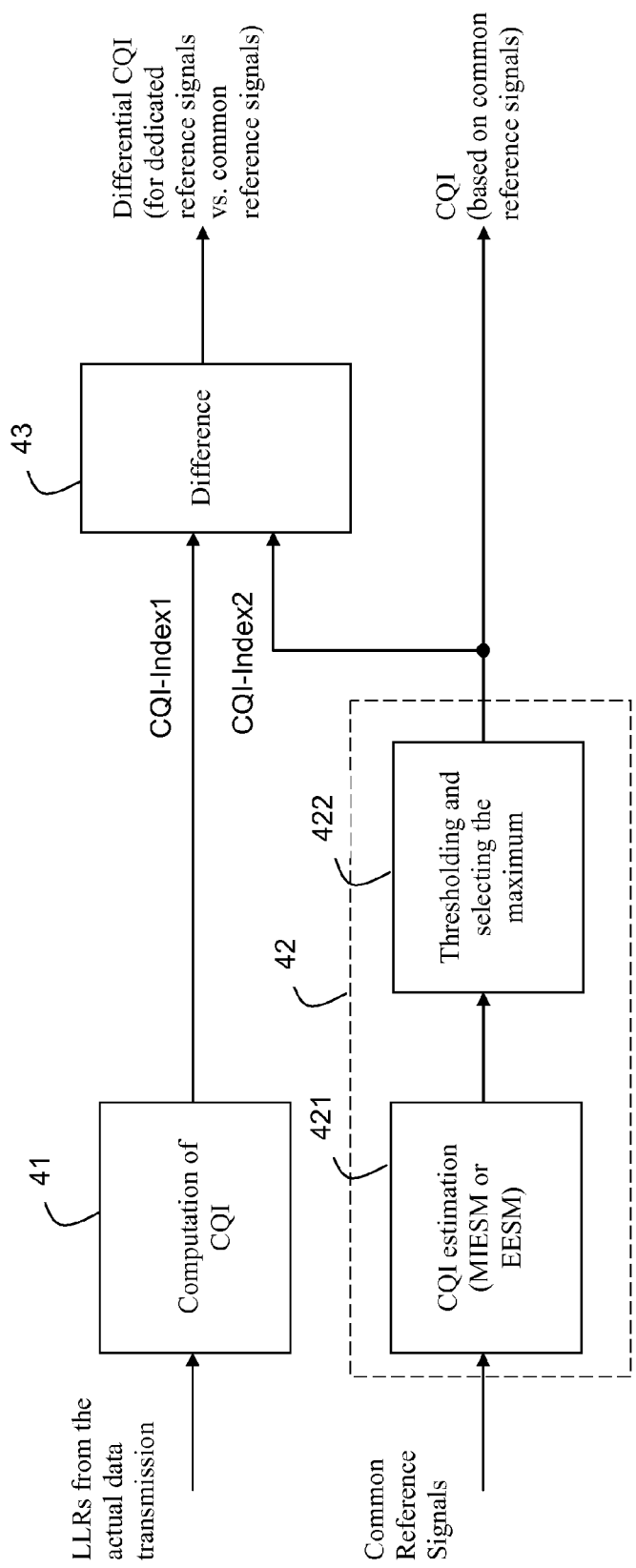
FIG. 3 shows en embodiment of determining a differential CQI

In an embodiment, rather than transmitting separate CQI values each for a transmission with common reference signals, and a transmission with dedicated reference signals, only one CQI value is transmitted together with a differential CQI value. Thereto FIG. 3 shows an exemplary block diagram with a first CQI determination circuit 41, a second CQI determination circuit 42 and a difference circuit 43. The first CQI determination circuit 41 determines a first CQI value CQI-Index1 on the base of the actual received data. Insofar, this circuit might employ the functions described under FIG. 3, especially the functions of the MI determination circuit 32a, the CQI Index determination circuit 32b, and the threshold setting circuit 33. The second CQI determination circuit 42 by way of example comprises a CQI estimation circuit 421 and a thresholding circuit 422. The CQI estimation circuit 421 estimates a CQI value based on common reference signals, e.g. employing EESM or MIESM methods as described above. The estimated CQI is fed to the thresholding circuit 422 that selects the maximum threshold below the estimated CQI to determine a second CQI value CQI-Index2. Both the first CQI value CQI-Index1 and the second CQI value CQI-Index2 are fed to the difference circuit 43, that determines a differential CQI index by way of example to be reported together with the second CQI value CQI-Index2 based on the common reference signals.

This embodiment allows reducing the feedback data rate. The differential CQI thereby might include the case that only a 1 bit flag is transmitted which indicates whether transmission with dedicated or common reference signals is preferred.

The described method has particular advantages for the case of beam forming with dedicated (UE specific) reference signals where CQI of the beam formed propagation channel needs to be calculated based on the actual data transmission.

Figure 4:
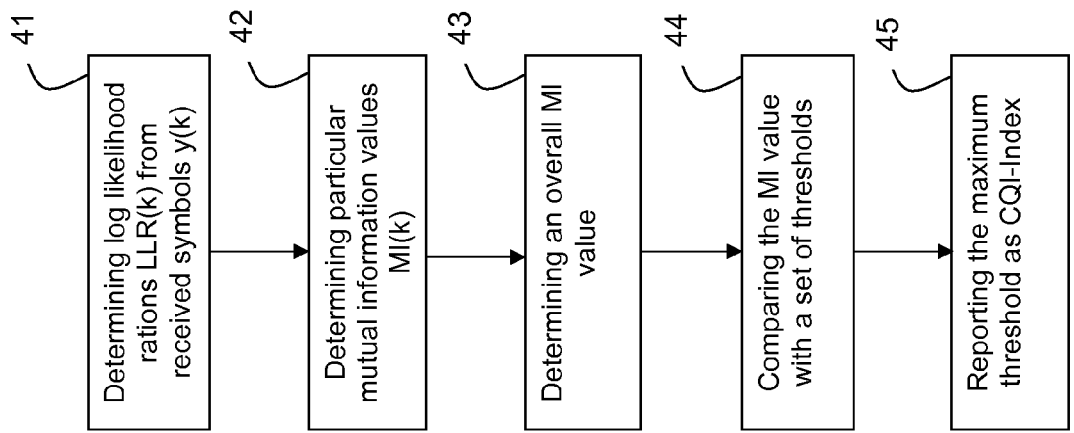
FIG. 4 shows an exemplary sequence diagram of a sequence being performed in the receiver according to FIG. 2.

FIG. 4 shows a flow chart diagram with exemplary summarized steps for determining CQI within a receiver as described under FIG. 1:

In a first step 41, log likelihood rations LLR(k) are determined from received modulation symbols.

In a second step 42, a particular mutual information values MI(k) is calculated for each LLR(k).

In a third step 43, an (overall) mutual information MI is calculated as a summary measure of the particular mutual information values MI(k), e.g. by averaging the particular mutual information values MI(k).

In a fourth step 44, the derived (overall MI) value is compared against a plurality of thresholds, e.g. each representing a certain channel condition.

In a fifth step 45, the maximum threshold that is below the derived MI value is determined as CQI-Index to be reported to the sender.

The invention claimed is:

1. A method of determining a channel quality of a communication channel between a wireless transmitter and a wireless receiver, comprising:
   receiving a transport block with one or a plurality of a modulation symbols comprising a plurality of encoded information bits,
   de-mapping the modulation symbols to a plurality of soft values,
   calculating a mutual information (MI) measure as a function of the plurality of soft values, wherein the MI measure is indicative of a mutual dependence between information bits and corresponding soft values of said transport block, and wherein the MI measure is determined by calculating an average over a plurality of particular MI measures that are each calculated as a function of an absolute value of one of the soft values, and
   determining a channel quality indication value as a function of the MI measure.

2. The method of claim 1, wherein determining the channel quality indication value comprises comparing the MI measure with a plurality of defined thresholds and determining a maximum threshold out of the defined thresholds that is below the MI measure, wherein the determined maximum threshold is to be chosen as the channel quality indication value to be reported to the wireless transmitter.

3. The method of claim 2, wherein the defined thresholds are chosen to result in a defined transport block error probability.

4. The method of claim 1, wherein the soft values are log likelihood ratios that are each associated with a corresponding one of the information bits.

5. The method of claim 1, wherein the communication channel comprises a plurality of sub channels with different sub channel propagation characteristics.

6. The method of claim 5, wherein the sub-channels are realized as sub-carriers, wherein a plurality of orthogonal modulated streams of data are transmitted in parallel on the sub carriers, exhibiting different signal-to-interference-noise-ratios (SINR) per sub-carrier, if the communication channel exhibits a selective fading.

7. The method of claim 2, wherein at least one of the defined thresholds is dependent on at least one of:
   a modulation and coding scheme,
   the size of the transport block,
   a particular power setting for an actual transmission, and an assumed power setting for determining the channel quality indication value.

8. The method of claim 1, wherein multiple input and multiple output (MIMO) transmissions with a plurality of different code words are performed, and wherein the method comprises determining individually for each code word an individual MI measure, and determining corresponding individual channel quality indication values to be fed back to the transmitter.

9. The method of claim 1, wherein a further channel quality indication value is determined on the basis of common reference signals, and wherein one of the channel quality indication value and the further channel quality indication value is transmitted together with a differential channel quality indication value indicative of a difference of both channel quality indication values.

10. A wireless receiver configured to determine a channel quality of a communication channel between a wireless transmitter and the wireless receiver, comprising:
 a modulation de-mapping circuit configured to receive a transport block with one or a plurality of a modulation symbols comprising a plurality of encoded information bits and to de-map the modulation symbols to a plurality of soft values,
 a mutual information determination circuit configured to calculate a mutual information (MI) measure as a function of the plurality of soft values, wherein the MI measure is indicative of a mutual dependence between information bits and corresponding soft values of said transport block, and wherein the MI measure is determined by calculating an average over a plurality of particular MI measures that are each calculated as a function of an absolute value of one of the soft values, and
 a CQI-Index determination circuit configured to determine a channel quality indication value as a function of the MI measure.

11. The wireless receiver of claim 10, wherein the CQI-Index determination circuit is configured to determine the channel quality indication value by comparing the MI measure with a plurality of defined thresholds and determining a maximum threshold out of the defined thresholds that is below the MI measure, wherein the determined maximum threshold is to be chosen as the channel quality indication value to be reported to the wireless transmitter.

12. The wireless receiver of claim 11, wherein the defined thresholds are chosen to result in a defined transport block error probability.

13. The wireless receiver of claim 10, wherein the soft values are log likelihood ratios that are each associated with a corresponding one of the information bits.

14. The wireless receiver of claim 10, wherein the communication channel comprises a plurality of sub channels with different sub channel propagation characteristics.

15. The wireless receiver of claim 14, wherein the sub-channels are realized as sub-carriers, wherein a plurality of orthogonal modulated streams of data are transmitted in parallel on the sub carriers, exhibiting different signal-to-interference-noise-ratios (SINR) per sub-carrier, if the communication channel exhibits a selective fading.

16. The wireless receiver of claim 10, wherein at least one of the defined thresholds is dependent on at least one of:
 a modulation and coding scheme,
 the size of the transport block,
 a particular power setting for an actual transmission, and
 an assumed power setting for determining the channel quality indication value.

17. The wireless receiver of claim 10, wherein multiple input and multiple output (MIMO) transmissions with a plurality of different code words are performed, and wherein the mutual information determination circuit is configured to determine individually for each code word an individual MI measure, and wherein the CQI-Index determination circuit is configured to determine corresponding individual channel quality indication values to be fed back to the transmitter.

18. A computer program product stored on a non-transitory computer readable medium and comprising computer program code that, when executed by a processing unit of a wireless receiver, causes the wireless receivers to determine a channel quality of a communication channel between a wireless transmitter and the wireless receiver, wherein the wireless receiver is configured to receive a transport block with one or a plurality of a modulation symbols comprising a plurality of encoded information bits, and wherein the computer program code causes the wireless receiver to:
 de-map the modulation symbols to a plurality of soft values,
 calculate a mutual information (MI) measure as a function of the plurality of soft values, wherein the MI measure is indicative of a mutual dependence between information bits and corresponding soft values of said transport block, and wherein the MI measure is determined by calculating an average over a plurality of particular MI measures that are each calculated as a function of an absolute value of one of the soft values, and
 determine a channel quality indication value as a function of the MI measure.

* * * * *